United States Patent
Dolan et al.

(10) Patent No.: US 12,506,759 B2
(45) Date of Patent: Dec. 23, 2025

(54) SYSTEM AND METHOD FOR DETECTING AND PREVENTING MALFEASANT ACTIVITY BASED ON PATTERNS IN MALFEASANT ACTIVITY

(71) Applicant: BANK OF AMERICA CORPORATION, Charlotte, NC (US)

(72) Inventors: Heather Roseann Dolan, Sarasota, FL (US); Adithya Gadwale, Falls Church, VA (US); Vikram Modi, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 195 days.

(21) Appl. No.: 18/221,108

(22) Filed: Jul. 12, 2023

(65) Prior Publication Data

US 2025/0023891 A1    Jan. 16, 2025

(51) Int. Cl.
*H04L 9/40* (2022.01)
*G06F 21/56* (2013.01)

(52) U.S. Cl.
CPC .......... *H04L 63/1425* (2013.01); *G06F 21/56* (2013.01); *G06F 21/562* (2013.01); *G06F 21/563* (2013.01); *H04L 63/1441* (2013.01); *H04L 63/1491* (2013.01)

(58) Field of Classification Search
CPC ...... G06F 21/56; G06F 21/563; G06F 21/562; H04L 63/1491
See application file for complete search history.

(56) References Cited

U.S. PATENT DOCUMENTS

| | | | |
|---|---|---|---|
| 8,181,248 B2* | 5/2012 | Oh | G06F 21/56 713/168 |
| 9,350,748 B1* | 5/2016 | McClintock | H04L 63/1491 |
| 11,822,374 B2* | 11/2023 | Saxe | G06F 21/562 |
| 11,956,255 B1* | 4/2024 | Holub | G06N 20/00 |
| 2024/0250971 A1* | 7/2024 | Rapowitz | G06Q 50/01 |
| 2024/0419793 A1* | 12/2024 | Stussi | G06F 21/563 |

* cited by examiner

*Primary Examiner* — Barbara B Anyan
(74) *Attorney, Agent, or Firm* — Moore & Van Allen PLLC; Nicholas C. Russell

(57) ABSTRACT

Systems, computer program products, and methods for detecting and preventing malfeasant activity based on patterns in malfeasant activity are provided. The method includes receiving a plurality of communication data packets associated with one or more online forums. Each communication data packet includes communication(s) within a conversation on the online forum(s). The method also includes determining a first malfeasant communication data packet of the plurality of communication data packets. The malfeasant communication data packet is associated with a conversation in which malfeasant activity is being discussed. The method further includes determining first malfeasant activity characteristic(s) from the first malfeasant communication data packet indicative of malfeasant activity. The method also includes detecting a potential malfeasant activity based on at least one of the first malfeasant activity characteristic(s). The method further includes causing an execution of a malfeasant activity mitigation action to reduce or eliminate potential effects of the potential malfeasant activity.

17 Claims, 5 Drawing Sheets

SYSTEM AND METHOD FOR DETECTING AND PREVENTING MALFEASANT ACTIVITY BASED ON PATTERNS IN MALFEASANT ACTIVITY

TECHNOLOGICAL FIELD

Example embodiments of the present disclosure relate generally to detecting and preventing malfeasant activity on a network and, more particularly, to detecting and preventing malfeasant activity based on patterns in malfeasant activity.

BACKGROUND

Malfeasant attacks may be carried out on networks using known tactics among the malfeasant actor community. However, tracking conversations with malfeasant actors can be difficult to do effectively in order to prevent malfeasant attacks. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for detecting and preventing malfeasant activity based on patterns in malfeasant activity is provided. The system includes at least one non-transitory storage device containing instructions and at least one processing device coupled to the at least one non-transitory storage device. The at least one processing device, upon execution of the instructions, is configured to receive a plurality of communication data packets associated with one or more online forums. Each communication data packet of the plurality of communication data packets includes one or more communications within a conversation on the one or more online forums. The at least one processing device, upon execution of the instructions, is also configured to determine a first malfeasant communication data packet of the plurality of communication data packets. The malfeasant communication data packet is associated with a conversation on the one or more online forums in which malfeasant activity is being discussed. The at least one processing device, upon execution of the instructions, is further configured to determine one or more first malfeasant activity characteristics from the first malfeasant communication data packet. The one or more first malfeasant activity characteristics are indicative of malfeasant activity. The at least one processing device, upon execution of the instructions, is also configured to detect a potential malfeasant activity based on at least one of the one or more first malfeasant activity characteristics. The potential malfeasant activity includes at least one of the one or more first malfeasant activity characteristics. The at least one processing device, upon execution of the instructions, is further configured to cause an execution of a malfeasant activity mitigation action. The malfeasant activity mitigation action reduces or eliminates one or more potential effects of the potential malfeasant activity.

In various embodiments, the at least one processing device, upon execution of the instructions, is configured to train a machine learning model using a data set that includes information from the first malfeasant communication data packet.

In various embodiments, the at least one processing device, upon execution of the instructions, is configured to determine a second malfeasant communication data packet of the plurality of communication data packets with the malfeasant communication data packet being associated with a conversation on the one or more online forums in which malfeasant activity is being discussed; and determine one or more second malfeasant activity characteristics from the second malfeasant communication data packet with the one or more second malfeasant activity characteristics being indicative of malfeasant activity.

In various embodiments, the at least one processing device, upon execution of the instructions, is configured to update a machine learning model based on the first malfeasant communication data packet or the second malfeasant communication data packet.

In various embodiments, the at least one processing device, upon execution of the instructions, is configured to detect a potential malfeasant activity based on at least one of the one or more second malfeasant activity characteristics and the potential malfeasant activity includes at least one of the one or more second malfeasant activity characteristics.

In various embodiments, the at least one processing device, upon execution of the instructions, is configured to detect a potential malfeasant activity based on at least one of the one or more first malfeasant activity characteristics and at least one of the one or more second malfeasant activity characteristics with the potential malfeasant activity including at least one of the one or more first malfeasant activity characteristics and at least one of the one or more second malfeasant activity characteristics.

In various embodiments, the malfeasant activity mitigation action blocks the potential malfeasant activity or the malfeasant activity mitigation action includes a malfeasant activity alert to be provided to a device associated with a network user.

In an example embodiment, a computer program product for detecting and preventing malfeasant activity based on patterns in malfeasant activity. The computer program product includes at least one non-transitory computer-readable medium having computer-readable program code portions embodied therein. The computer-readable program code portions include one or more executable portions configured to receive a plurality of communication data packets associated with one or more online forums. Each communication data packet of the plurality of communication data packets includes one or more communications within a conversation on the one or more online forums. The computer-readable program code portions also include one or more executable portions configured to determine a first malfeasant communication data packet of the plurality of communication data packets. The malfeasant communication data packet is associated with a conversation on the one or more online forums in which malfeasant activity is being discussed. The computer-readable program code portions further include one or more executable portions configured to determine one or more first malfeasant activity characteristics from the first malfeasant communication data packet. The one or more first malfeasant activity characteristics are indicative of malfeasant activity. The computer-readable program code portions still further include one or more executable portions configured to detect a potential malfeasant activity based on at least one of the one or more first malfeasant activity characteristics. The potential malfeasant activity includes at least one of the one or more first malfeasant activity characteristics. The computer-readable program code portions also include one or more executable portions configured to cause an execution of a malfeasant activity mitigation action. The malfeasant activity mitigation action reduces or eliminates one or more potential effects of the potential malfeasant activity.

In various embodiments, the computer-readable program code portions include one or more executable portions are also configured to train a machine learning model using a data set that includes information from the first malfeasant communication data packet.

In various embodiments, the computer-readable program code portions include one or more executable portions are also configured to determine a second malfeasant communication data packet of the plurality of communication data packets with the malfeasant communication data packet being associated with a conversation on the one or more online forums in which malfeasant activity is being discussed; and determine one or more second malfeasant activity characteristics from the second malfeasant communication data packet with the one or more second malfeasant activity characteristics being indicative of malfeasant activity.

In various embodiments, the computer-readable program code portions include one or more executable portions are also configured to update a machine learning model based on the first malfeasant communication data packet or the second malfeasant communication data packet.

In various embodiments, the computer-readable program code portions include one or more executable portions are also configured to detect a potential malfeasant activity based on at least one of the one or more second malfeasant activity characteristics with the potential malfeasant activity including at least one of the one or more second malfeasant activity characteristics.

In various embodiments, the computer-readable program code portions include one or more executable portions are also configured to detect a potential malfeasant activity based on at least one of the one or more first malfeasant activity characteristics and at least one of the one or more second malfeasant activity characteristics with the potential malfeasant activity including at least one of the one or more first malfeasant activity characteristics and at least one of the one or more second malfeasant activity characteristics.

In various embodiments, the malfeasant activity mitigation action blocks the potential malfeasant activity or the malfeasant activity mitigation action includes a malfeasant activity alert to be provided to a device associated with a network user.

In another example embodiment, a method for detecting and preventing malfeasant activity based on patterns in malfeasant activity is provided. The method includes receiving a plurality of communication data packets associated with one or more online forums. Each communication data packet of the plurality of communication data packets includes one or more communications within a conversation on the one or more online forums. The method also includes determining a first malfeasant communication data packet of the plurality of communication data packets. The malfeasant communication data packet is associated with a conversation on the one or more online forums in which malfeasant activity is being discussed. The method further includes determining one or more first malfeasant activity characteristics from the first malfeasant communication data packet. The one or more first malfeasant activity characteristics are indicative of malfeasant activity. The method still further includes detecting a potential malfeasant activity based on at least one of the one or more first malfeasant activity characteristics. The potential malfeasant activity includes at least one of the one or more first malfeasant activity characteristics. The method also includes causing an execution of a malfeasant activity mitigation action. The malfeasant activity mitigation action reduces or eliminates one or more potential effects of the potential malfeasant activity.

In various embodiments, the method includes training a machine learning model using a data set that includes information from the first malfeasant communication data packet.

In various embodiments, the method includes determining a second malfeasant communication data packet of the plurality of communication data packets with the malfeasant communication data packet being associated with a conversation on the one or more online forums in which malfeasant activity is being discussed; and determining one or more second malfeasant activity characteristics from the second malfeasant communication data packet with the one or more second malfeasant activity characteristics being indicative of malfeasant activity.

In various embodiments, the method includes detecting a potential malfeasant activity based on at least one of the one or more second malfeasant activity characteristics with the potential malfeasant activity including at least one of the one or more second malfeasant activity characteristics.

In various embodiments, the method includes detecting a potential malfeasant activity based on at least one of the one or more first malfeasant activity characteristics and at least one of the one or more second malfeasant activity characteristics with the potential malfeasant activity including at least one of the one or more first malfeasant activity characteristics and at least one of the one or more second malfeasant activity characteristics.

In various embodiments, the malfeasant activity mitigation action blocks the potential malfeasant activity, or the malfeasant activity mitigation action includes a malfeasant activity alert to be provided to a device associated with a network user.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1A:
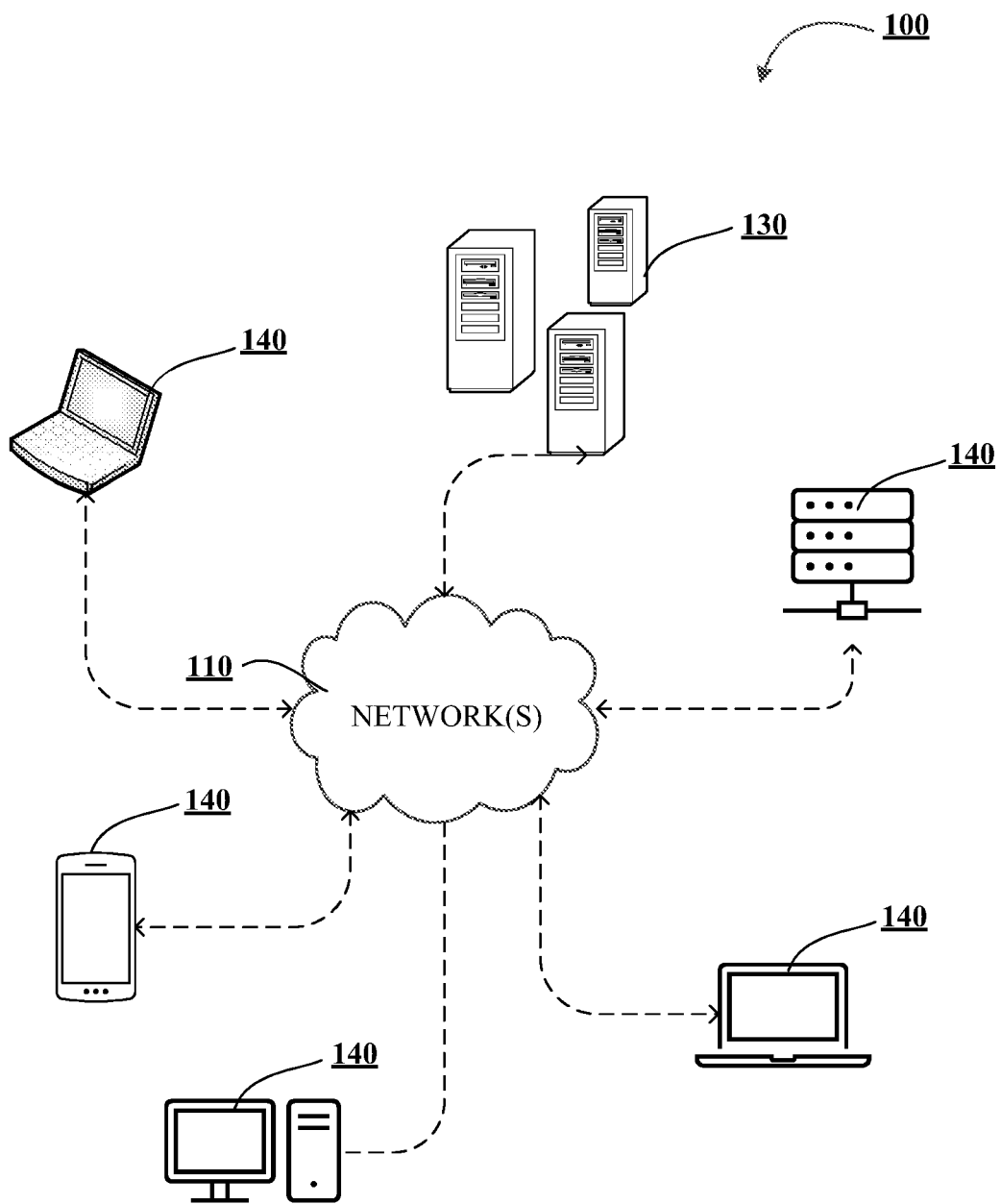
FIGS. 1A-1C illustrates technical components of an example distributed computing environment for detecting and preventing malfeasant activity based on patterns in malfeasant activity, in accordance with various embodiments of the present disclosure.

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure, and positioning (distal phalanges, intermediate phalanges, proximal phalanges, and the like)), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, an "online forum" may refer to any internet-enabled communication method, such as message board, websites, chat rooms, and/or the like. Examples of online forums may include public websites (e.g., a website with user posts that are accessible to anyone on internet), semi-public websites (e.g., a website with user posts that are accessible by members of the website), or private websites (e.g., a members-only chat room).

Malfeasant actors may discuss strategies for carrying out malfeasant attacks on the internet. Due to the breadth of the internet communities, monitoring different online forums for malfeasant discussions is difficult to do in real-time. Due to memory and processing limits, online forums are typically not continuously monitored for discussions relating to malfeasant activity. As such, malfeasant actors have found safe harbor on online forums that are otherwise accessible by the public. Therefore, strategies and tactics of malfeasant actors are accessible, but difficult to retrieve effectively.

Various embodiments of the present disclosure allow for detecting and preventing malfeasant activity based on patterns in malfeasant activity. The system monitors online forums for conversations relating to malfeasant activity. The conversations may include specific strategies for malfeasant attacks (e.g., successful tactics, unsuccessful tactics, targets, ideas for attacks, etc.). The system identifies conversations relating to malfeasant activity. Malfeasant activity characteristics are determined from the conversations. The malfeasant activity characteristics are indicative of an attempted malfeasant attack. The malfeasant activity characteristics are used to detect potential malfeasant activity within a network. Additionally, the malfeasant activity characteristics may be used to test network security (e.g., the malfeasant activity characteristics may be used to identify weaknesses in the network). The system is configured to cause an execution of a malfeasant activity mitigation action to mitigate and/or stop potential attack. Malfeasant activity mitigation actions may include alert(s) to users, restriction of network access, blocking malfeasant communications, and/or the like. Additional online information, such as dark web data, private chatroom messages, and/or the like may also be used in combination with the malfeasant activity characteristics to detect potential malfeasant activity.

Figure 1B:
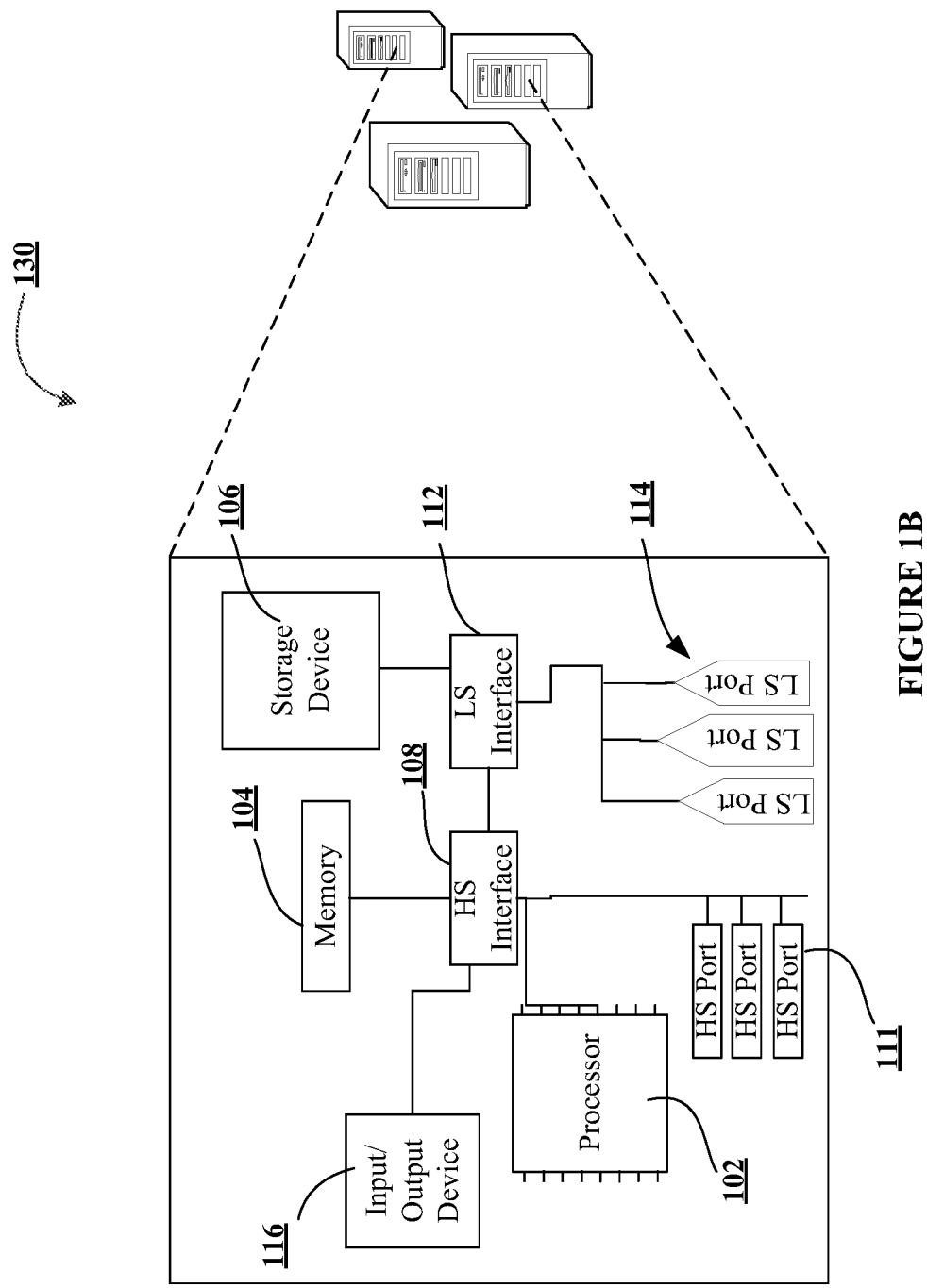
Figure 1C:
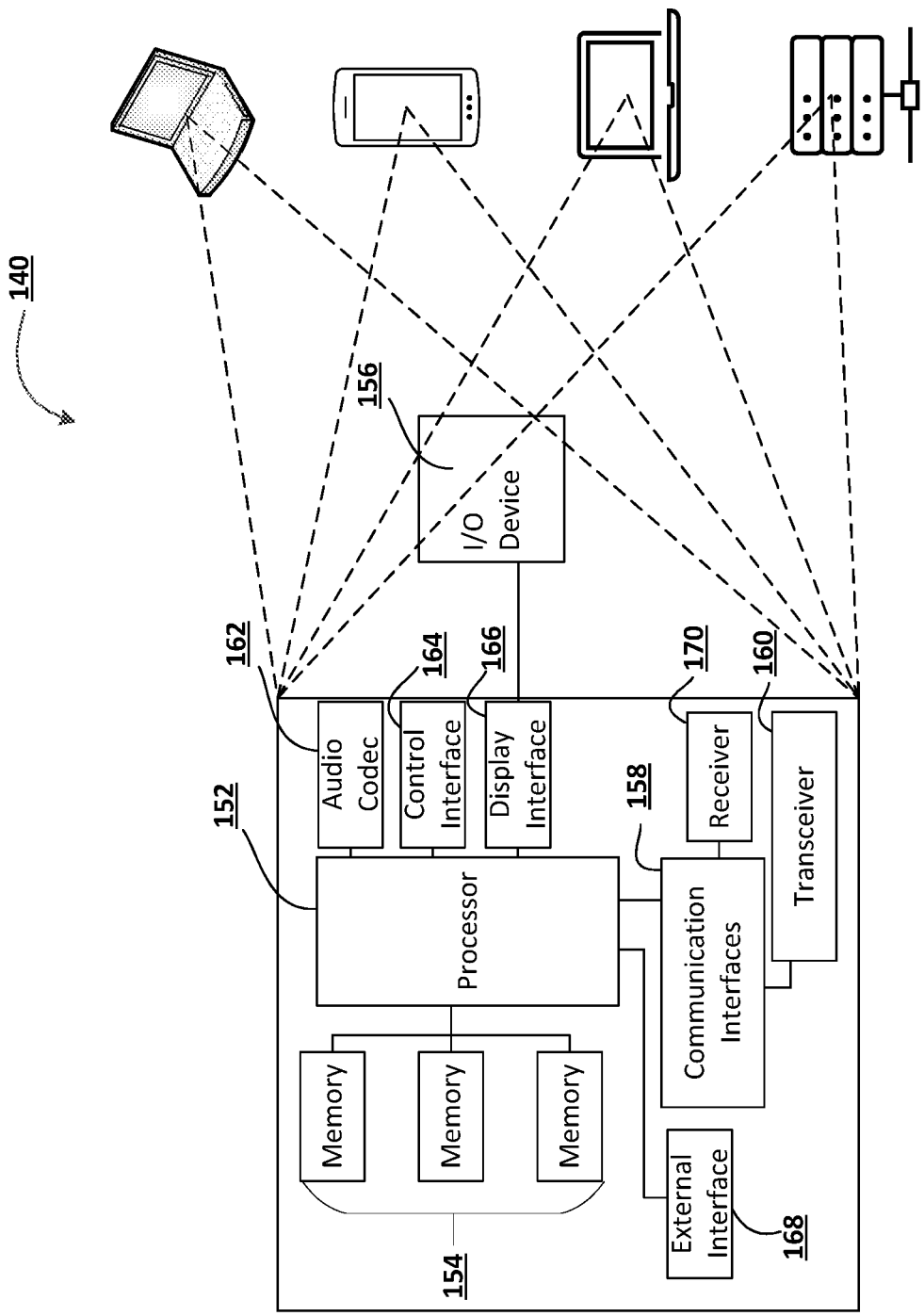

FIGS. 1A-1C illustrate technical components of an example distributed computing environment for detecting and preventing malfeasant activity based on patterns in malfeasant activity, in accordance with various embodiments of the disclosure. As shown in FIG. 1A, the distributed computing environment 100 contemplated herein may include a system 130 (e.g., a malfeasant activity detection device), an end-point device(s) 140, and one or more networks 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network(s) 110. Instead of having a central server (e.g., system 130) which would act as the shared drive, each device that is connect to the network(s) 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network(s) 110 may be a distributed network that is spread over different networks. This provides a single data communication network, which can be managed jointly or separately by each network. Besides shared communication within the network, the distributed network often also supports distributed processing. The network(s) 110 may be a form of digital communication network such as a telecommunication network, a local area network ("LAN"), a wide area network ("WAN"), a global area network ("GAN"), the Internet, satellite network, cellular network, and/or any combination of the foregoing. The network(s) 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 110. Each of the components 102, 104, 106 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interfaces 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network(s) 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through at least one of communication interfaces 158, which may include digital signal processing circuitry where necessary. Communication interfaces 158 may provide for communications under various modes or protocols, such as the Internet Protocol (IP) suite (commonly known as TCP/IP). Protocols in the IP suite define end-to-end data handling methods for everything from packetizing, addressing, and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interfaces 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130. The end-point device(s) 140 may include a communication interface that is configured to operate with a satellite network.

In various embodiments, the end-point device(s) 140 may have multiple communication interfaces that are configured to operate using the various communication methods discussed herein. For example, an end-point device 140 may have a cellular network communication interface (e.g., a communication interface that provides for communication under various telecommunications standards) and a satellite network communication interface (e.g., a communication interface that provides for communication via a satellite network). Various other communication interfaces may also be provided by the end-point device (e.g., an end-point device may be capable of communicating via a cellular network, a satellite network, and/or a wi-fi connection). Various communication interfaces may share components with other communication interfaces in the given end-point device.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
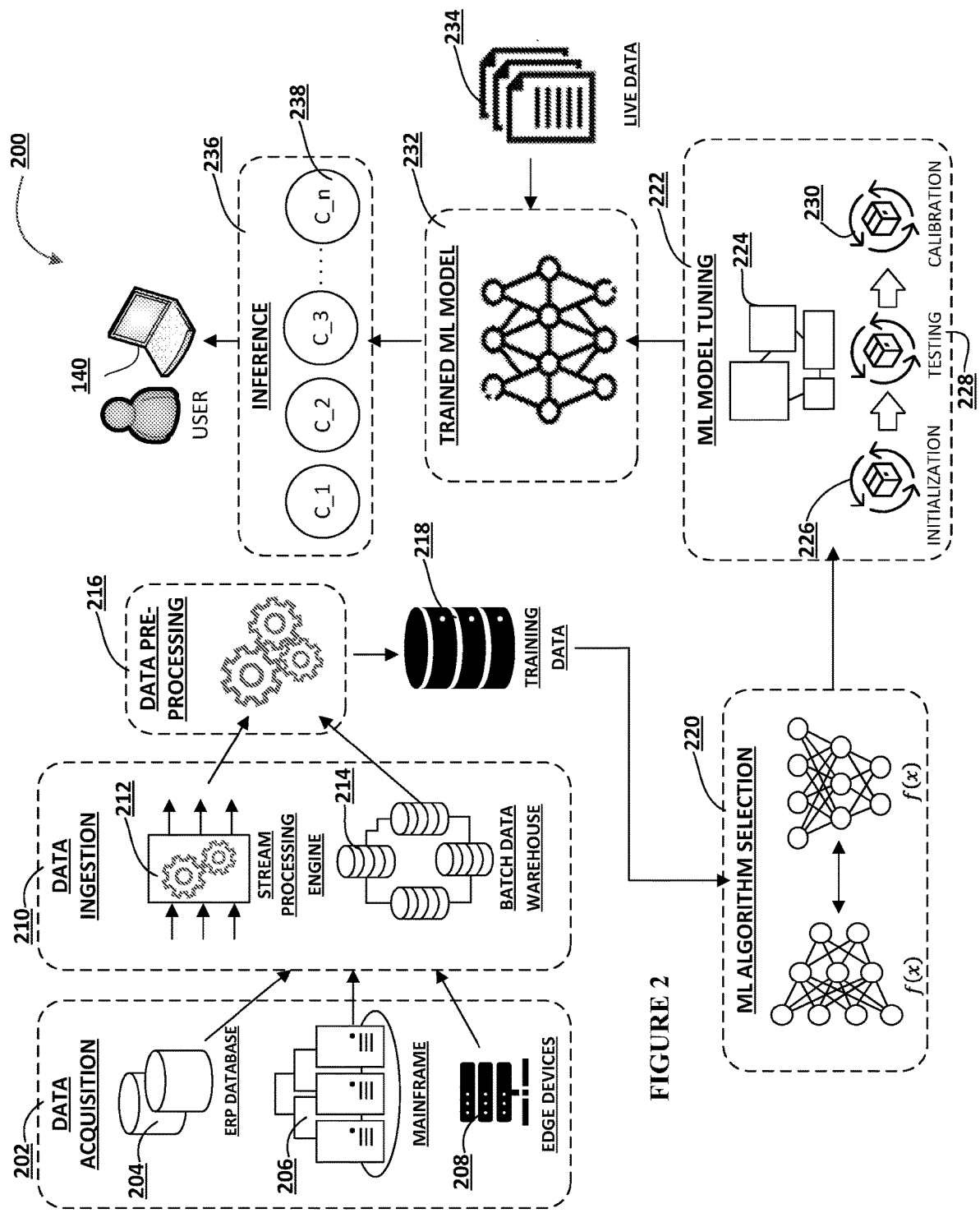
FIG. 2 illustrates an example machine learning (ML) subsystem architecture used to detect and prevent malfeasant activity based on patterns in malfeasant activity, in accordance with various embodiments of the present disclosure.

FIG. 2 illustrates an example machine learning (ML) architecture 200, in accordance with an embodiment of the present disclosure. The ML subsystem architecture may be part of the components of the environment 100 (e.g., system 130). The ML subsystem architecture is used to detect and prevent malfeasant activity based on patterns in malfeasant activity as discussed below in reference to FIG. 3. Namely, the ML subsystem architecture may be used to train the system to detect malfeasant activity discussed in one or more communication data packets and/or detect potential malfeasant activity based on the malfeasant communication data packets.

The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is example and that other embodiments may vary. As another example, in some embodiments, the machine learning subsystem 200 may include more, fewer, or different components.

Figure 3:
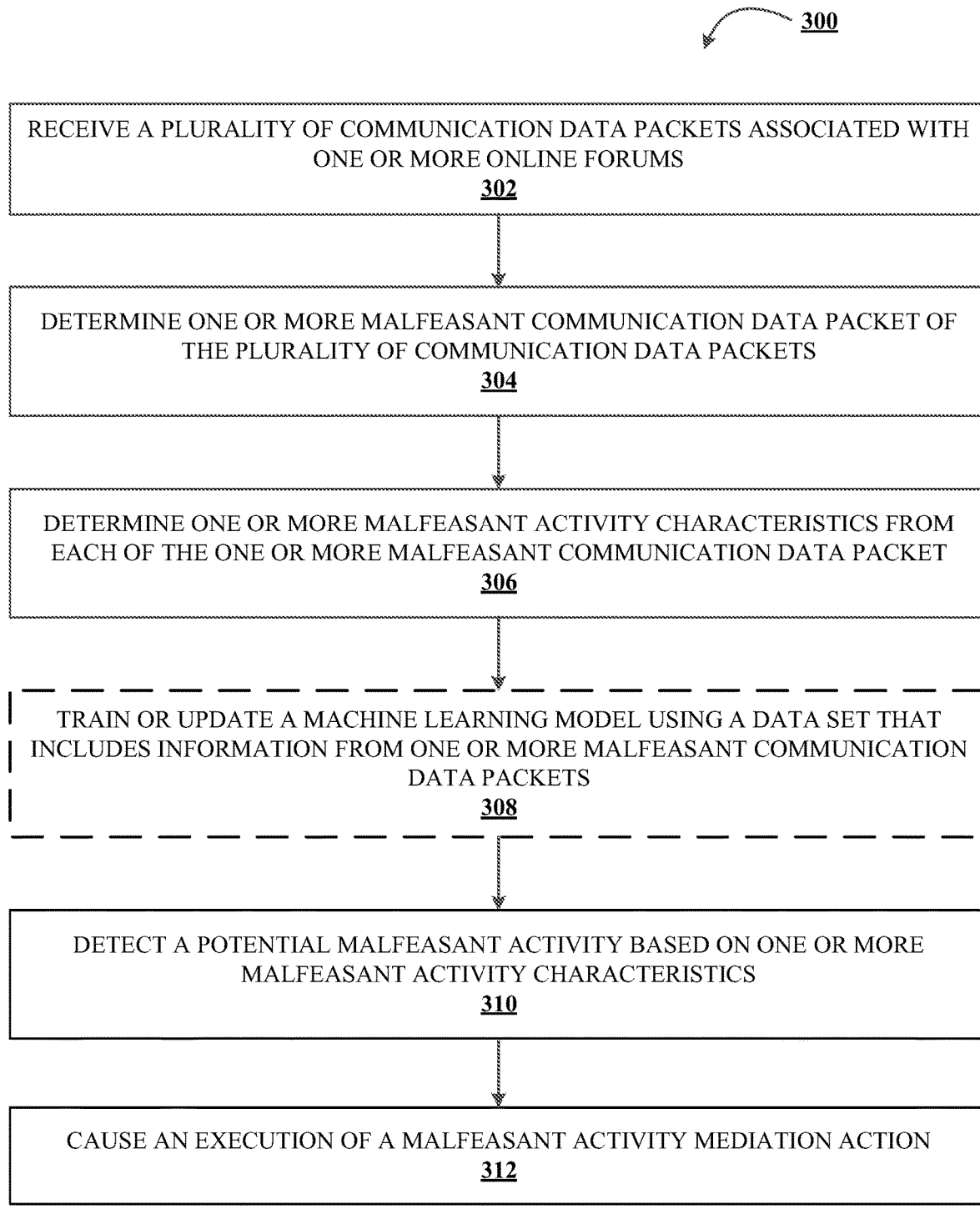
FIG. 3 illustrates a process flow for detecting and preventing malfeasant activity based on patterns in malfeasant activity, in accordance with various embodiments of the present disclosure.

FIG. 3 is a flow chart 300 that illustrates an example method of detecting and preventing malfeasant activity based on patterns in malfeasant activity. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein. A method of various embodiments may include any combination or subset of the features discussed herein.

Referring now to Block 302 of FIG. 3, the method includes receiving a plurality of communication data packets associated with one or more online forums. Each communication data packet of the plurality of communication data packets may include one or more communications within a conversation on the one or more online forums. For example, the communication data packet may be textual, verbal, and/or a combination. The communication data packet includes information relating to a conversation between users on an online forum (e.g., a website that allows for communication between users). The communication data packet may include the substance of the conversation (e.g., a log of the chat), information relating to the online forum (e.g., website name and information), information relating to users on the online forum and/or active in the conversation (e.g., usernames, actual names, etc.), and/or the like.

The one or more communication data packets may be retrieved from a singular online forum (e.g., a single website may be monitored for discussion relating to malfeasant activity). Additionally or alternatively, multiple online forums may be used to gather communication data packets. The online forums may be public websites (e.g., a website with user posts that are accessible to anyone on internet), semi-public websites (e.g., a website with user posts that are accessible by members of the website), or private websites (e.g., a members-only chat room).

In various embodiments, the system or a system associated with the system may monitor one or more online forums for communication relating to malfeasant activity. Such monitoring may be active (e.g., continuous or near-continuous monitoring) and/or periodic (e.g., the online forum(s) may be monitored weekly or monthly). The monitoring may be limited based on the content of the online forum (e.g., a sub-portion of a website may be dedicated to malfeasant activities and as such, the system may monitor said sub-portion for conversations relating to malfeasant activity). In various embodiments, the system may also use keyword monitoring of one or more online forums. For example, the system may monitor public conversations that include keywords relating to malfeasant activity.

Referring now to Block 304 of FIG. 3, the method includes determining one or more malfeasant communication data packet of the plurality of communication data packets. The malfeasant communication data packet may be associated with a conversation on the one or more online forums in which malfeasant activity is being discussed. The conversation may be determined to be related to malfeasant activity based on the content of the conversation (e.g., the actual words of the conversation), the individuals posting in the conversation (e.g., some users may have been previously tagged as malfeasant actors), the type of online forum in which the conversation is discussed (e.g., certain online forums may be used primarily for malfeasant activity discussions and as such, conversations in the given forum is presumed to be relating to malfeasant activity), and/or the like. For example, individuals posting about malfeasant activity may be tracked based on the username of each individual, such that connections between users may be identified in order to more easily detect conversations relating to malfeasant activity (e.g., any conversations that include a certain combination of users is likely related to malfeasant activity).

In various embodiments, the one or more malfeasant communication data packet may include at least a first malfeasant communication data packet. In various embodiments, the one or more malfeasant communication data packet may include a first malfeasant communication data packet and a second malfeasant communication data packet. In various embodiments, additional malfeasant communication data packet may also be determined (e.g., a third malfeasant communication data packet, a fourth malfeasant communication data packet, etc.). The present disclosure discusses a first malfeasant communication data packet and/or a second malfeasant communication data packet, but the malfeasant communication data packets are not necessarily sequential, and the system may determine any number of malfeasant communication data packets. As such, the operations and/or usage of the first malfeasant communication data packet and/or the second malfeasant communication data packet may also be carried out on any other malfeasant communication data packets.

In various embodiments, the system may determine that a communication data packet is a malfeasant communication data packet based on similarities with previous conversations relating to malfeasant activity. For example, the malfeasant conversations may have similar conversation structure in an instance in which malfeasant activity is discussed (e.g., users may use the same language, similar keywords, etc.).

Referring now to Block 306 of FIG. 3, the method includes determining one or more malfeasant activity characteristics from each of the one or more malfeasant communication data packet. For example, the system may determine one or more first malfeasant activity characteristics from the first malfeasant communication data packet. Additionally or alternatively, the system may determine one or more second malfeasant activity characteristics from the second malfeasant communication data packet.

In various embodiments, the malfeasant activity characteristics are indicative of malfeasant activity. The malfeasant activity characteristics may include potential targets (e.g., certain users may be more targeted than others by certain types of malfeasant attacks), attack characteristics (e.g., format of an attack, method of attack, etc.), attack time periods (e.g., typical time periods in which an attack is used), systems affected by the discussed malfeasant attacks, and/or the like.

In various embodiments, the malfeasant activity characteristics may be used to test network security (e.g., the malfeasant activity characteristics may be used to identify weaknesses in the network). In various embodiments, the malfeasant activity characteristics may be monitored to determine whether a network would be susceptible to the discussed malfeasant attack. For example, a discussion relating to a malfeasant attack strategy may include specific information relating to network settings and the system may determine whether the given network has the same or similar network setting. As such, the network can be improved before any malfeasant attacks are attempted.

The malfeasant activity characteristics (e.g., the first malfeasant activity characteristics, the second malfeasant activity characteristics, etc.) may include one or more patterns and/or frameworks of malfeasant attacks (e.g., a pattern and/or framework of a malfeasant attacks may include affected parties, types of attacks (e.g., identity-based, credit-based, falsified document-based), attack timing, and/or the like).

Referring now to optional Block 308 of FIG. 3, the method includes training or updating a machine learning model using a data set that includes information from one or more malfeasant communication data packets (e.g., the first malfeasant communication data packet, the second malfeasant communication data packet, etc.). In various embodiments, the method may use any of the components of the ML architecture 200 shown and discussed above in reference to FIG. 2 to train and/or update a machine learning model. In various embodiments, a machine learning model may be trained to detect malfeasant activity across a network based on the one or more malfeasant communication data packets discussed herein.

In various embodiments, the machine learning model may be used to detect malfeasant communication data packets. For example, the system may determine a conversation between users on an online forum is related to malfeasant activity based on previous conversations relating to malfeasant activity (e.g., conversations may include similar users, similar questions, similar keywords, and/or the like).

The machine learning model may be trained via information gather in the operations herein. In various embodiments, information relating to malfeasant communication data packets may be stored to train the machine learning model. For example, different types of malfeasant communication data packets may include different malfeasant activity characteristics that can be used to train the machine learning model.

In various embodiments, the data relating to the operations herein may be provided to a third party assigned with detecting malfeasant activity. As such, the data may be used by the third party to update any learning models. For example, the system may have a third-party screening software that provides an indication to the system that a communication data packet may be malfeasant (e.g., the system may identify a malfeasant communication data packet based on the indication from the third-party screening software that the given communication data packet may be malfeasant).

In various embodiments, the same and/or another machine learning model may be trained, updated, and/or used to determine malfeasant communication data packets from the plurality of communication data packets. For example, the machine learning model used to determine malfeasant communication data packets may be trained using previous conversations relating to malfeasant activity. Additional conversations relating to malfeasant activity may be used to update the machine learning model used to determine communication data packets.

In various embodiments, the machine learning models may be trained and/or updated using information from other sources. For example, data from the dark web and/or private direct messaging may be used to train and/or update the model along with the information gathered from online forums. In such an embodiment, the system may impersonate an anonymous user in order to retrieve such information.

Referring now to Block 310 of FIG. 3, the method includes detecting a potential malfeasant activity based on one or more malfeasant activity characteristics. Potential malfeasant activity may be any network activity that may potentially be malfeasant. Examples of network activity include communications with user(s) in a network, attempting to gain network access, browsing network data (e.g., accessing databases relating to a network entity), data transmission requests (e.g., a request to transfer data between devices or networks), and/or any other type of actions across a network and/or on a device associated with the network.

In various embodiments, the potential malfeasant activity may be targeted at a device associated with a user. In various embodiments, the malfeasant activity may be targeted at multiple users in a network. The potential malfeasant activity may be in the form of a communication with the user (e.g., emails, instant messages, voice messages, etc. that are intended for users within the network).

In various embodiments, the potential malfeasant activity may be detected based on at least one of the one or more first malfeasant activity characteristics. In such an embodiment, the potential malfeasant activity includes at least one of the one or more first malfeasant activity characteristics. For example, the one or more first malfeasant activity may include a specific format of an email that is used in a malfeasant attack. As such, a potential malfeasant activity may be determined in an instance in which an email with similar or the same formatting is received by a network. In various embodiments, potential malfeasant activity may be determined based on multiple shared characteristics with the one or more first malfeasant activity characteristics. For example, the first malfeasant communication data packet may indicate that certain users in an entity may be targeted using a certain type of attack. As such, the system may determine potential malfeasant activity in which said user(s) receives a message that may be the specific type of attack. In various embodiments, the number of first malfeasant activity characteristics shared with the network activity in order to be designated as a potential malfeasant activity may be based on the level of network security desired. For example, the more first malfeasant activity characteristics shared by the network activity, the more likely the network activity is malfeasant.

In various embodiments, the potential malfeasant activity may be detected based on at least one of the one or more second malfeasant activity characteristics. In such an embodiment, the potential malfeasant activity includes at least one of the one or more second malfeasant activity characteristics. The second malfeasant activity characteristics may be determined from the second malfeasant communication data packet just as the first malfeasant activity characteristics are determined from the first malfeasant communication data packet as discussed above.

In various embodiments, the potential malfeasant activity may be detected based on at least one of the one or more first malfeasant activity characteristics and at least one or more second malfeasant activity characteristics. For example, malfeasant actors may use a combination of tactics from multiple different malfeasant attacks in order to avoid detection of a malfeasant attack.

Referring now to Block 312 of FIG. 3, the method includes causing an execution of a malfeasant activity mitigation action. The malfeasant activity mitigation action may reduce and/or eliminate one or more potential effects of the potential malfeasant activity. In various embodiments, the malfeasant activity mitigation action may include blocking the potential malfeasant activity. The potential malfeasant activity may be blocked in different ways based on the network activity. For example, a malfeasant login may be blocked. In another example, a malfeasant actor that is accessing documents with malfeasant intent, may have network access restricted or blocked completely.

In various embodiments, the malfeasant activity mitigation action may include a malfeasant activity alert to be provided to a device associated with a network user. For example, in an instance in which the potential malfeasant activity is directed to a target user (e.g., a malfeasant communication directed to a network user), the target user may be notified with information relating to the potential malfeasant attack. In various embodiments, a malfeasant activity alert may be transmitted to other network users with information relating to potential malfeasant attacks (e.g., similarly situated network users with similar access and/or job titles may be targeted by similar or the same malfeasant attacks). The malfeasant activity alert may be transmitted to any users that may be targeted by such a malfeasant attack. As such, the system may determine one or more potential target based on the one or more malfeasant activity characteristics (e.g., the first malfeasant activity characteristic(s), the second malfeasant activity characteristic(s), etc.). In an example embodiment, a conversation on an online forum relating to malfeasant activity may include specific types of users that may be susceptible to the discussed attack. For example, a salesperson may receive a large number of communications from outside vendors and a conversation may indicate that creating malfeasant communications that are disguised as messages from vendors have a higher likelihood of success. As such, any salespeople on the network may be notified to be careful with messages from unknown vendors.

In various embodiments, the malfeasant activity mitigation action may include a malfeasant activity alert to be provided to a device associated with a security user (e.g., a network specialist that investigates the potential malfeasant activity). In such an instance, the malfeasant activity alert may provide the security user with information to investigate the potential malfeasant activity. In such an instance, the system may receive a response from the security user indicating whether the potential malfeasant activity was correctly designated. In such an instance, the response from the security user may be used to update the machine learning model used to determine malfeasant activity. The investigation by the security user may be completed in real-time or near real-time to the potential malfeasant attack (e.g., allowing the security user to perform mitigating actions). Additionally or alternatively, the malfeasant activity alert may be transmitted to the security user after the potential malfeasant activity in order to prevent future attacks and/or update machine learning models for future detection.

In various embodiments, the malfeasant activity mitigation action may include one or more changes to the network. For example, an entity may have network settings that leave the network vulnerable to specific types of malfeasant attacks. As such, the network setting may be adjusted to protect the network. The changes to the network may be based on a detected potential malfeasant activity and/or the one or more malfeasant communication data packets. For example, a conversation on an online forum may include specific network shortcomings that leave networks vulnerable to attacks and said information may be used to change the network to fix such vulnerabilities.

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications, and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for detecting and preventing malfeasant activity based on patterns in malfeasant activity, the system comprising:

at least one non-transitory storage device containing instructions; and at least one processing device coupled to the at least one non-transitory storage device, wherein the at least one processing device, upon execution of the instructions, is configured to:

receive a plurality of communication data packets associated with one or more online forums, wherein each communication data packet of the plurality of communication data packets includes substance of a conversation on the one or more online forums, wherein the one or more online forums comprise public websites, semi-public websites, and private websites;

determine a first malfeasant communication data packet of the plurality of communication data packets, wherein the malfeasant communication data packet is associated with a conversation on the one or more online forums in which malfeasant activity is being discussed;

determine a second malfeasant communication data packet of the plurality of communication data packets, wherein the second malfeasant communication data packet is associated with a conversation on the one or more online forums in which a second malfeasant activity is being discussed;

determine one or more malfeasant activity characteristics from the first malfeasant communication data packet and the second malfeasant communication data packet, wherein the one or more malfeasant activity characteristics comprise attack characteristics of malfeasant activity;

train a machine learning model using a data set that comprises the one or more malfeasant activity characteristics from the first malfeasant communication data packet and the second malfeasant communication data packet;

detect, within network activity, a potential malfeasant activity using the machine learning model, wherein the potential malfeasant activity comprises at least one of the one or more malfeasant activity characteristics; and cause an execution of a malfeasant activity mitigation action within the network activity, wherein the malfeasant activity mitigation action reduces or eliminates one or more potential effects of the potential malfeasant activity.

2. The system of claim 1, wherein the at least one processing device, upon execution of the instructions, is configured to:

determine a third malfeasant communication data packet of the plurality of communication data packets, wherein the malfeasant communication data packet is associated with a conversation on the one or more online forums in which malfeasant activity is being discussed; and determine one or more third malfeasant activity characteristics from the second malfeasant communication data packet, wherein the one or more second malfeasant activity characteristics are indicative of malfeasant activity.

3. The system of claim 2, wherein the at least one processing device, upon execution of the instructions, is configured to update a machine learning model based on the first malfeasant communication data packet, the second malfeasant communication data packet, and the third malfeasant communication data packet.

4. The system of claim 2, wherein the at least one processing device, upon execution of the instructions, is configured to detect a potential malfeasant activity based on at least one of the one or more third malfeasant activity characteristics, wherein the potential malfeasant activity comprises at least one of the one or more third malfeasant activity characteristics.

5. The system of claim 2, wherein the at least one processing device, upon execution of the instructions, is configured to detect a potential malfeasant activity based on at least one of the one or more first malfeasant activity characteristics, at least one of the one or more second malfeasant activity characteristics, and at least one of the one or more third malfeasant activity characteristics, wherein the potential malfeasant activity comprises at least one of the one or more first malfeasant activity characteristics, at least one of the one or more second malfeasant activity characteristics, and at least one of the one or more third malfeasant activity characteristics.

6. The system of claim 1, wherein the malfeasant activity mitigation action blocks the potential malfeasant activity or the malfeasant activity mitigation action comprises a malfeasant activity alert to be provided to a device associated with a network user.

7. A computer program product for detecting and preventing malfeasant activity based on patterns in malfeasant activity, the computer program product comprising at least one non-transitory computer-readable medium having computer-readable program code portions embodied therein, the computer-readable program code portions comprising one or more executable portions configured to:

receive a plurality of communication data packets associated with one or more online forums, wherein each communication data packet of the plurality of communication data packets includes substance of a conversation on the one or more online forums, wherein the one or more online forums comprise public websites, semi-public websites, and private websites;

determine a first malfeasant communication data packet of the plurality of communication data packets, wherein the malfeasant communication data packet is associated with a conversation on the one or more online forums in which malfeasant activity is being discussed;

determine a second malfeasant communication data packet of the plurality of communication data packets, wherein the second malfeasant communication data packet is associated with a conversation on the one or more online forums in which a second malfeasant activity is being discussed;

determine one or more malfeasant activity characteristics from the first malfeasant communication data packet and the second malfeasant communication data packet, wherein the one or more first malfeasant activity characteristics comprise attack characteristics of malfeasant activity;

train a machine learning model using a data set that comprises the one or more malfeasant activity characteristics from the first malfeasant communication data packet and the second malfeasant communication data packet;

detect, within network activity, a potential malfeasant activity using the machine learning model, wherein the potential malfeasant activity comprises at least one of the one or more malfeasant activity characteristics, wherein the potential malfeasant activity comprises; and cause an execution of a malfeasant activity mitigation action within the network activity, wherein the malfeasant activity mitigation action reduces or eliminates one or more potential effects of the potential malfeasant activity.

8. The computer program product of claim 7, wherein the computer-readable program code portions comprising one or more executable portions are also configured to:

determine a third malfeasant communication data packet of the plurality of communication data packets, wherein the malfeasant communication data packet is associated with a conversation on the one or more online forums in which malfeasant activity is being discussed; and determine one or more third malfeasant activity characteristics from the second malfeasant communication data packet, wherein the one or more second malfeasant activity characteristics are indicative of malfeasant activity.

9. The computer program product of claim 8, wherein the computer-readable program code portions comprising one or more executable portions are also configured to update a machine learning model based on the first malfeasant communication data packet, the second malfeasant communication data packet, and the third malfeasant communication data packet.

10. The computer program product of claim 8, wherein the computer-readable program code portions comprising one or more executable portions are also configured to detect a potential malfeasant activity based on at least one of the one or more third malfeasant activity characteristics, wherein the potential malfeasant activity comprises at least one of the one or more third malfeasant activity characteristics.

11. The computer program product of claim 8, wherein the computer-readable program code portions comprising one or more executable portions are also configured to detect a potential malfeasant activity based on at least one of the one or more first malfeasant activity characteristics, at least one of the one or more second malfeasant activity characteristics, and at least one of the one or more third malfeasant activity characteristics, wherein the potential malfeasant activity comprises at least one of the one or more first malfeasant activity characteristics, at least one of the one or more second malfeasant activity characteristics, and at least one of the one or more third malfeasant activity characteristics.

12. The computer program product of claim 7, wherein the malfeasant activity mitigation action blocks the potential malfeasant activity or the malfeasant activity mitigation action comprises a malfeasant activity alert to be provided to a device associated with a network user.

13. A method for detecting and preventing malfeasant activity based on patterns in malfeasant activity, the method comprising:
   receiving a plurality of communication data packets associated with one or more online forums, wherein each communication data packet of the plurality of communication data packets includes substance of a conversation on the one or more online forums, wherein the one or more online forums comprise public websites, semi-public websites, and private websites;
   determining a first malfeasant communication data packet of the plurality of communication data packets, wherein the malfeasant communication data packet is associated with a conversation on the one or more online forums in which malfeasant activity is being discussed;
   determining a second malfeasant communication data packet of the plurality of communication data packets, wherein the second malfeasant communication data packet is associated with a conversation on the one or more online forums in which a second malfeasant activity is being discussed;
   determining one or more malfeasant activity characteristics from the first malfeasant communication data packet and the second malfeasant communication data packet, wherein the one or more malfeasant activity characteristics comprise attack characteristics of malfeasant activity;
   training a machine learning model using a data set that comprises the one or more malfeasant activity characteristics from the first malfeasant communication data packet and the second malfeasant communication data packet;
   detecting, within network activity, a potential malfeasant activity using the machine learning model, wherein the potential malfeasant activity comprises at least one of the one or more malfeasant activity characteristics; and
   causing an execution of a malfeasant activity mitigation action within the network activity, wherein the malfeasant activity mitigation action reduces or eliminates one or more potential effects of the potential malfeasant activity.

14. The method of claim 13, further comprising:
   determining a third malfeasant communication data packet of the plurality of communication data packets, wherein the malfeasant communication data packet is associated with a conversation on the one or more online forums in which malfeasant activity is being discussed; and
   determining one or more third malfeasant activity characteristics from the second malfeasant communication data packet, wherein the one or more second malfeasant activity characteristics are indicative of malfeasant activity.

15. The method of claim 14, further comprising detecting a potential malfeasant activity based on at least one of the one or more third malfeasant activity characteristics, wherein the potential malfeasant activity comprises at least one of the one or more third malfeasant activity characteristics.

16. The method of claim 14, further comprising detecting a potential malfeasant activity based on at least one of the one or more first malfeasant activity characteristics, at least one of the one or more second malfeasant activity characteristics, and at least one of the one or more third malfeasant activity characteristics, wherein the potential malfeasant activity comprises at least one of the one or more first malfeasant activity characteristics, at least one of the one or more second malfeasant activity characteristics, and at least one of the one or more third malfeasant activity characteristics.

17. The method of claim 13, wherein the malfeasant activity mitigation action blocks the potential malfeasant activity or the malfeasant activity mitigation action comprises a malfeasant activity alert to be provided to a device associated with a network user.

* * * * *